J. BRENSIKE.
APPARATUS FOR MANUFACTURING CHEESE.
APPLICATION FILED AUG. 4, 1908.
933,056.
Patented Sept. 7, 1909.
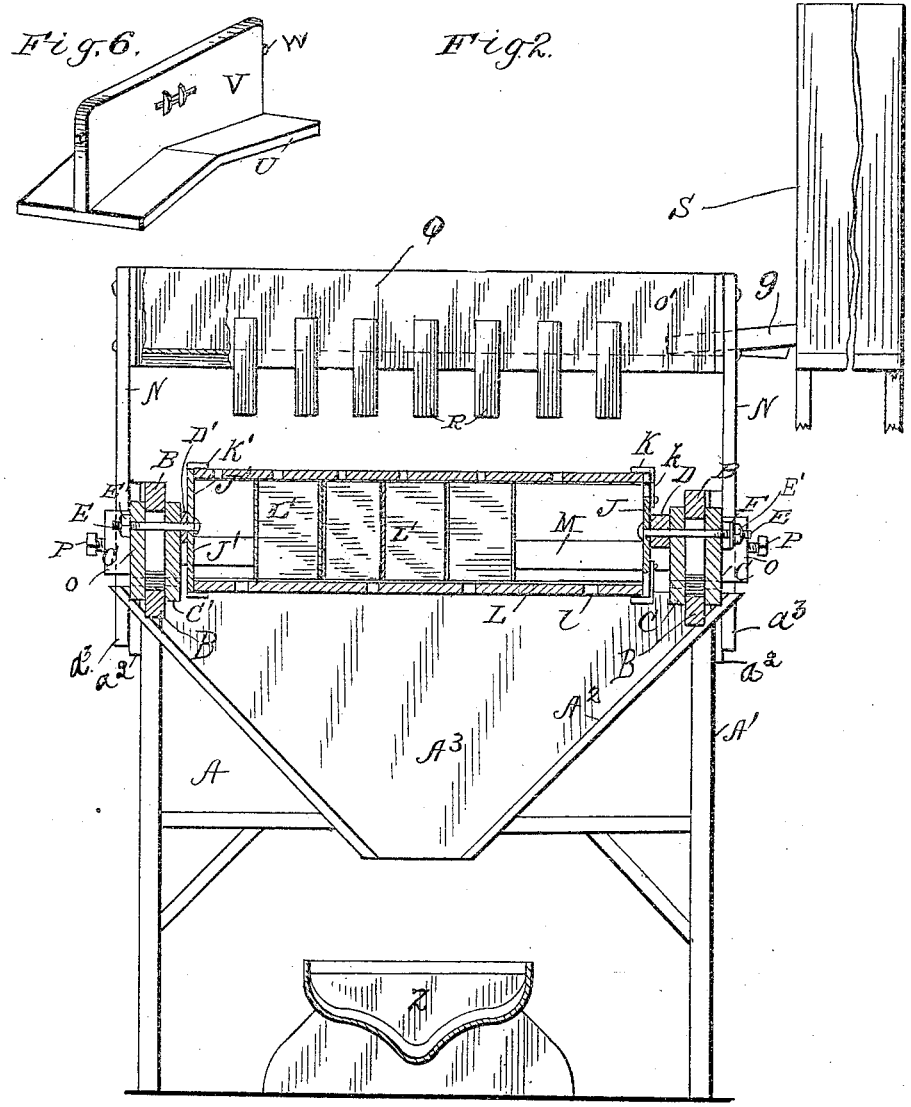
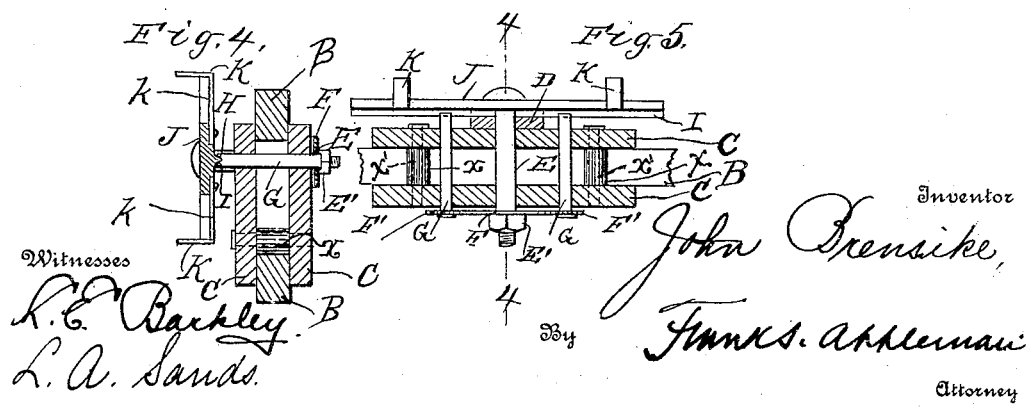

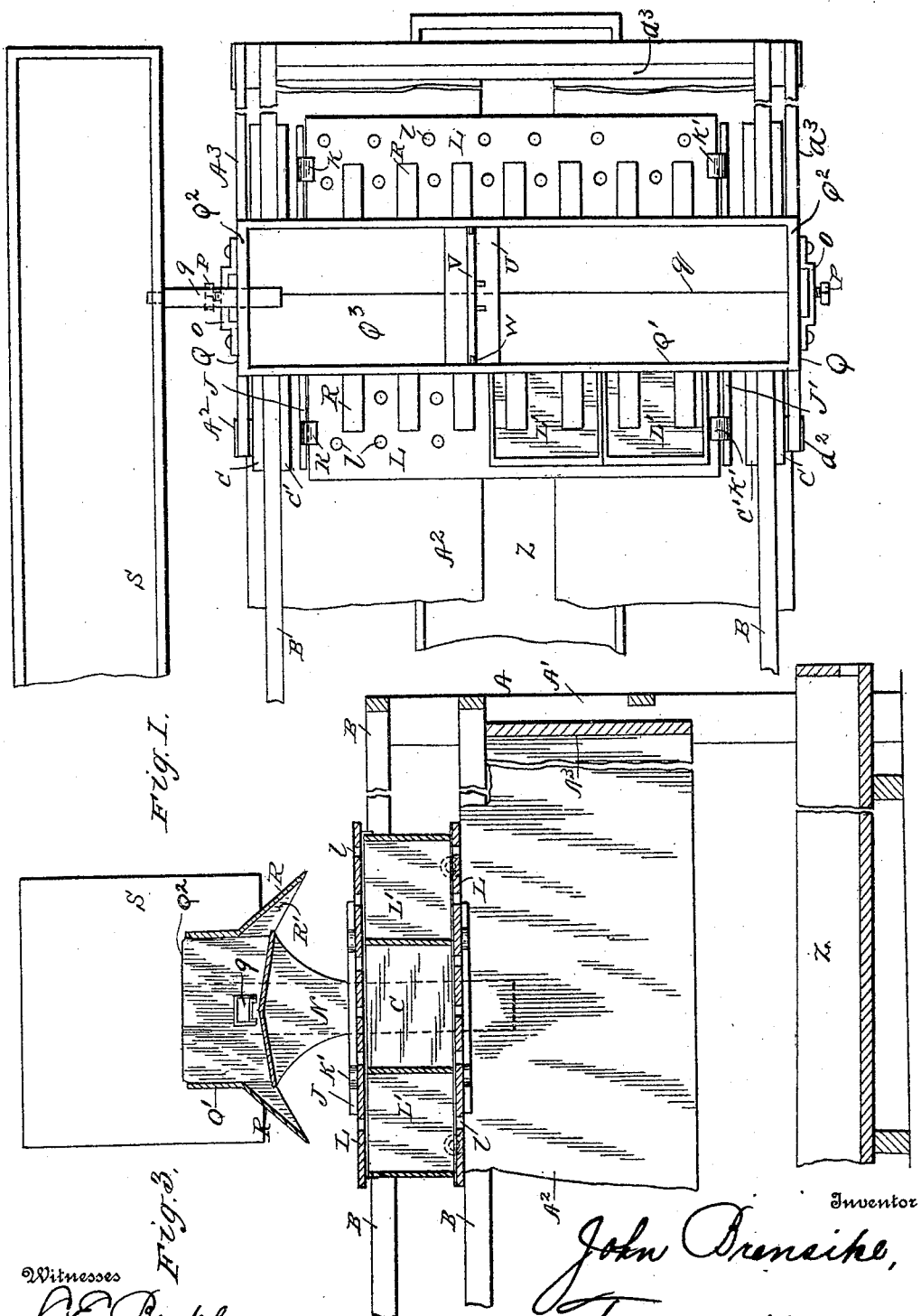

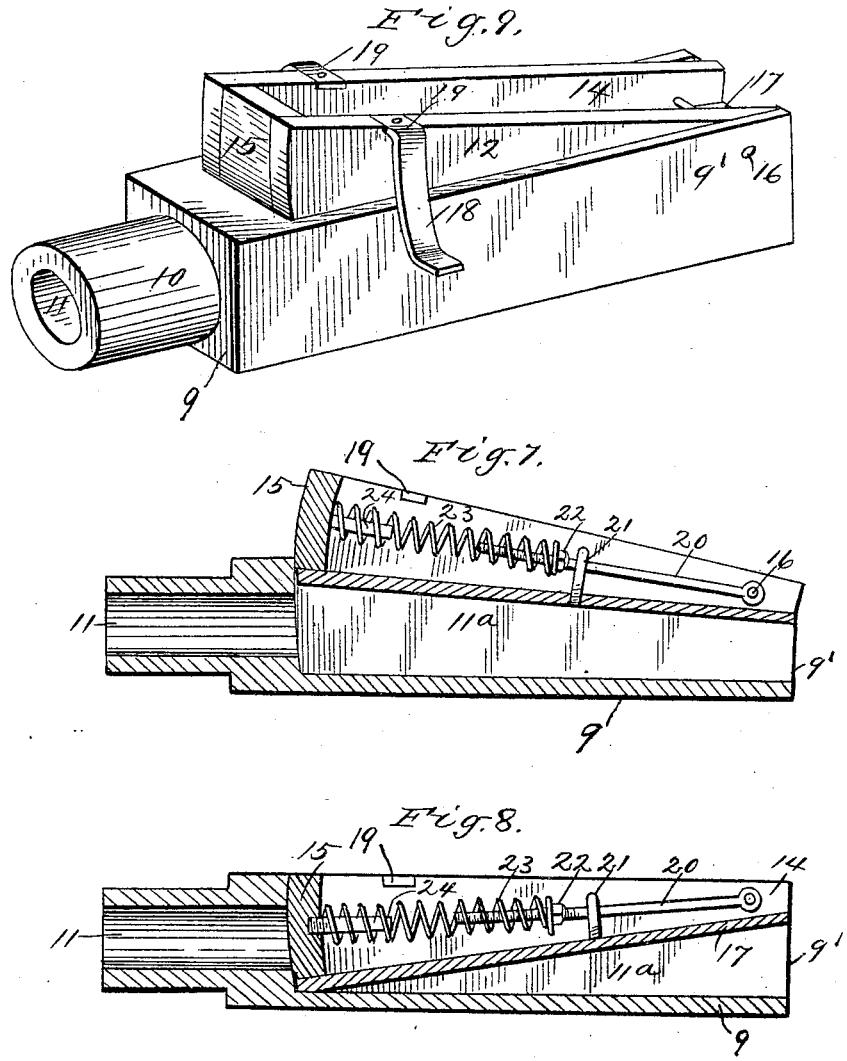

UNITED STATES PATENT OFFICE.

JOHN BRENSIKE, OF HUSTISFORD, WISCONSIN.

APPARATUS FOR MANUFACTURING CHEESE.

933,056.

Specification of Letters Patent. Patented Sept. 7, 1909.

Application filed August 4, 1908. Serial No. 446,906.

*To all whom it may concern:*

Be it known that I, JOHN BRENSIKE, a citizen of the United States of America, residing at Hustisford, in the county of Dodge and State of Wisconsin, have invented certain new and useful Improvements in Apparatus for Manufacturing Cheese, of which the following is a specification.

This invention relates to improvements in apparatus for manufacturing soft cheese but can be utilized for making ordinary pressed cheese.

One of the principal features of this invention relates more particularly to handling the curd or casein in a quick and expeditious manner thus producing a much better product than is produced by the old and objectionable method of dipping the curd when filling the molds. This latter method produces an inferior product as all curd must be handled quickly.

A further object of this invention is to provide novel means for conveying the curd and whey through a suitable channel in a perfect mixed condition before entering the molds and for simultaneously filling a number of molds.

A further object of this invention is to provide novel means for filling two or more sets of molds simultaneously from opposite sides of a canal box or receptacle for containing the curd and whey.

A further object of the invention is to provide novel means for regulating the supply of curd contained in the canal box or receptacle by means of a sliding division board or partition so that a definite number of molds may be filled.

A further object of the invention is to provide a novel traveling device mounted on guides for the drain boards and molds, whereby the molds can be filled consecutively and by means of a pivotal connection can be turned or held stationary through a spring attachment secured thereon for drawing the whey from the curd.

A further object is to have a long drain box for supporting the entire apparatus thereon, the sides of said box being tapered and being opened its entire length.

A further object of the invention is to have a canal box or receptacle supported on removably secured standards and a plurality of spouts on the opposing sides of said canal box or receptacle whereby the mold immediately under said receptacle or canal box can be filled with curds or other products.

A further object of the invention is to provide a suitable faucet or valve for feeding the products of the vat to the canal box or receptacle in uniform flow irrespective of the contents of the vat.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, represents a plan view of the device partly broken away; Fig. 2, represents a vertical transverse section of the apparatus with the canal box in elevation; Fig. 3, represents a longitudinal vertical section of the device with one end broken away; Fig. 4, represents an end view in section taken through Fig. 5, in the direction of the dotted line 4—4 on the guides or ways with the spring traveling device thereon; Fig. 5, represents a longitudinal section of the spring acting traveling device for supporting the drain boards and molds; Fig. 6, represents a perspective view of the sliding partition for regulating the number of spouts employed in filling the molds; Fig. 7, represents a bottom view in central vertical longitudinal section of the faucet with the valve open; Fig. 8, represents a similar view with the valve closed; and Fig. 9, represents a bottom view of the faucet in perspective with the valve open.

This invention consists of a frame A, which is provided with legs A', supporting a drain box, said box having inclined or sloping sides $A^2$, and closed ends $A^3$. The drain box is bottomless in order to allow all the whey in the apparatus to drain into the trough $z$, from whence it can be conveyed to any suitable place. Said legs A', and supplemental legs $a^2$, support guides or ways B, B, on opposite sides of the apparatus. Removably secured through pivotal connections E, to said ways B, are guide blocks C and C', forming a portion of the traveling device. Adjacent to said blocks C, C', are washers D, D', which fill the space between the inside guide blocks and the traveling plates J and J′, for supporting the drain boards L and molds L′, the said drain boards being provided with perforations *l*.

The legs A′, are braced at the end of the apparatus by tie bars M, to give strength and stability to the structure. Secured to said legs A′, and supplemental legs $a^2$, are bars $a^3$, for supporting the adjustable standards N. Through the medium of staples O, said standards N, are provided with set screws P, for regulating the height of said standards in relation to the canal box or receptacle Q. The canal box Q, is secured to said standards at the ends $Q^2$, thereof. The sides Q′, of said canal box are provided with a plurality of spouts R, which are closed at their tops but have their bottoms R′, open to allow the products that may be in said canal box or receptacle to pass down in a vertical direction thus preventing a gushing forth of the combined curd and whey where the canal box is fully charged. The bottom $Q^3$, of this receptacle is inclined from a central point *q*, down toward the spouts R, and by this means the receptacle discharges all the products therein. Within said canal box Q, is a sliding partition U, having a vertical portion V. It will be observed that the contour U, of the sliding partition is similar to the bottom $Q^3$, of the canal box and by this means the partition can make compartments of any desired length in said canal box which is very desirable when only a limited number of molds are to be filled with curd. Arranged on the ends of said vertical portion V, are two rubber faced spring stops W for holding said partition U, in any desired position when filling the molds L.

The traveling device with its parts J′ and C′, is rigid as regards the means for securing the drain boards L. The gibs K′, are integral with the cast traveling plates J′, but the opposite traveling devices J and C, respectively, are differently arranged. The gibs K, are spring-actuated having a spring portion *k*, extending some distance down the back of the traveling plate J; said spring yielding when pressed upon on their portions K, thus allowing the drain boards L, to snap or spring past said gibs, retaining the drain boards in position as indicated in Fig. 2, of the accompanying drawings.

On the back of the outside guide block C, is a long spring F, which is tapered at the ends F′, and is perforated in order to receive and sustain two rods G. These rods G, extend through the two guide blocks C, and impinge upon a fin I, formed on the back of the cast traveling plate J. The ends of said rods G, have notches H, in their free ends so as to engage said fin I, said fin I, also passing through a notch formed in the washer D. The plate J′, is pivoted on the bolt or pivotal connection E, and can move in any vertical direction, but is held from such movement (when the drain boards are thereon) by its opposing member J, through the medium of the fin I, which engages the two rods G. The drain boards L and the molds L′, form a bridge and prevent turning of the parts aforesaid, except when properly manipulated by hand. When necessary to turn the molds for draining the opposite sides of the cheese therein, the operator gives a quick push on the end of the plate J, when the fin I, will slip beyond the notches H, in said rods G, on account of the resilience of the spring F, which yields at the ends F′, owing to the fact that the middle portion of said spring F, is secured by the nut E′, on the pivotal bolt E. The guide blocks are suitably spaced apart by means of rollers X, which are mounted on bolts X′ and it will readily be seen that the movement of the carriage will be greatly assisted thereby.

Mounted above the canal box or receptacle Q, is a box or vat S, designed to hold the combined products to be treated in the apparatus. Extending from said vat is a faucet 9, which is of unique and novel construction. It is rectangular in contour and is provided with sides 9′, a rounded portion 10, which is designed to enter the side of the vat S, and an aperture 11, said aperture leading into a chamber $11^a$, for allowing the liquids to pass out as indicated in Fig. 7, of the drawings. The valve portion is provided with sides 12, and has a recessed portion 14, and bottom 17. The end 15, is the valve proper and is adjustable longitudinally in the recess 14, through the medium of the spring mechanism therein, which consists of a pivotal connection 16, operating handles 18, secured to the sides 12, at 19, and a rod 20, pivoted to the pin 16, and extending through a support 21, and within a spiral spring 23, the latter being supported by a rigid pin 24, secured in the valve 15. The face end of the rod 20, is screw threaded for the reception of a nut 22, to regulate the tension of said spring 23, as the face of the valve 15, gradually wears away through constant use.

When the curd and whey are put into the vat S, they are constantly stirred to fully mix the products before passing through the faucet 9, into the canal box or receptacle, it being understood that machinery may be applied for agitating the products in the vat if necessary. When the products in the vat are of the proper consistency, they are discharged into the canal box through the faucet 9, and from thence into the mold boxes through the spouts R. After being filled a draining board is put on top of the molds and held in position thereon by means of the springs and gibs K and K′. Interposed between the molds and the drain boards are pieces of burlap which allow the whey to pass through the interstices thereof, but will not allow the curds to pass through. After the additional board is sprung on top of the molds, the device is turned on the pivotal connection E, when the lowermost drain board which is now the uppermost one is removed from the device when the lower drain board is removed with the cheese thereon.

I claim—

1. An apparatus for manufacturing cheese mounted on a frame and provided with adjustable standards for supporting a canal box or receptacle for curds or casein.

2. An apparatus for manufacturing cheese provided with a framework, adjustable standards mounted on said frame supporting a receptacle or canal box for holding the products necessary to produce cheese, and spouts projecting from the sides of said receptacle or canal box.

3. An apparatus for assisting in manufacturing cheese consisting of a frame for supporting a drain box, ways or guides mounted above said drain box, a traveling device on said ways or guides for holding cheese molds, and means for filling said cheese molds.

4. An apparatus for manufacturing cheese consisting of a frame for supporting a drain box, ways or guides mounted above said drain box, a traveling device on said ways or guides for holding cheese molds, a receptacle mounted above said cheese molds, and means for filling said cheese molds from said receptacle.

5. A device of the character described provided with means for filling cheese molds through the medium of a traveling device mounted on ways for supporting and draining said molds.

6. An apparatus for producing cheese which consists of a frame having an adjustable receptacle mounted thereon, ways arranged adjacent to said adjustable receptacle for supporting a traveling device provided with cheese molds and the means for filling said cheese molds and draining the same.

7. An apparatus for manufacturing cheese consisting of a frame for supporting a drain box, ways or guides mounted above said drain box, a traveling device provided with drain boards, molds mounted on said drain boards and means for filling said molds with products for making cheese.

8. An apparatus for manufacturing cheese, consisting of a frame for supporting a drain box having inclined sides, ways or guides mounted above said drain box, a traveling device provided with drain boards and burlap thereon mounted on said traveling device, a receptacle or canal above said mold, and spouts extending from the sides of said canal box or receptacle.

9. An apparatus for manufacturing cheese provided with a vat, a faucet extending from said vat for conveying the products of said vat to a receptacle or canal box, spouts mounted on said receptacle or canal box, cheese molds adjacent to said spouts mounted on a traveling device and means for turning said traveling device.

10. An apparatus for manufacturing cheese provided with a frame, a drain box supported on said frame, a canal box or receptacle provided with spouts on the opposite sides thereof, means for conveying cheese producing products within said canal box or receptacle, and ways or guides mounted on said frame for supporting traveling devices having molds thereon.

11. An apparatus for manufacturing cheese which is provided with a traveling device mounted on ways or guides, guide blocks forming part of said traveling device, and pivotally connected to traveling plates on said traveling device, draining boards having molds on said draining boards, and means for revolving said traveling device.

12. An apparatus for producing cheese which is provided with a traveling device mounted on guides or ways, means on said traveling device for holding the same in a rigid position, and means for revolving said traveling device in combination with drain boards and molds.

13. An apparatus for producing cheese provided with a traveling device, spring actuating mechanism for holding the traveling device in a rigid position, pivotal connections for turning said traveling device, drain boards mounted on said traveling device through the medium of spring gibs or hooks, molds located on said drain boards and means for filling said molds.

14. An apparatus for producing cheese consisting of a frame, guides or ways mounted on said frame, a traveling device provided with drain boards and molds thereon, a canal box situated above said drain boards and molds, means for filling said molds from said canal box, a sliding partition within said canal box, for shutting off a portion of said canal box, spring actuated means for retaining said sliding partition in any desired position.

In testimony whereof I affix my signature in the presence of two witnesses.

JOHN BRENSIKE.

Witnesses:
WILLIAM E. REIM,
WILLIAM HUTH.